(12) United States Patent
Wong et al.

(10) Patent No.: US 6,418,222 B2
(45) Date of Patent: Jul. 9, 2002

(54) HIGH CURRENT PROTECTION CIRCUIT FOR TELEPHONE INTERFACE

(75) Inventors: Wayne Kwok-Wai Wong, Camarillo; Saul Rodriguez, Port Hueneme, both of CA (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/753,097

(22) Filed: Jan. 2, 2001

Related U.S. Application Data

(63) Continuation of application No. 09/054,922, filed on Apr. 3, 1998.

(51) Int. Cl.[7] ................................................ H04M 1/00
(52) U.S. Cl. ................................ 379/412; 379/395.01
(58) Field of Search ............................... 379/372–373, 379/377–378, 380, 382, 393–394, 400–405, 412, 395.01; 323/226, 273–277; 361/10, 18–20, 45–46, 93.1, 93.9, 105–106; 307/33–36

(56) References Cited

U.S. PATENT DOCUMENTS

| | | | |
|---|---|---|---|
| 3,624,489 A | 11/1971 | Betton | 323/226 |
| 3,652,922 A | 3/1972 | Healey et al. | 323/278 |
| 3,711,763 A | 1/1973 | Peterson | 323/276 |
| 3,989,902 A | 11/1976 | Cowpland | 179/81 |
| 4,143,247 A | 3/1979 | Yoshitoshi et al. | 179/81 |
| 4,903,295 A | 2/1990 | Shannon et al. | 379/437 |
| 5,179,488 A * | 1/1993 | Rovner | 361/18 |
| 5,237,483 A | 8/1993 | Gara | 361/119 |
| 5,333,196 A * | 7/1994 | Jakab | 379/412 |
| 5,357,089 A | 10/1994 | Prentice | 330/298 |
| 5,519,775 A | 5/1996 | Lagana et al. | 379/412 |
| 5,745,322 A * | 4/1998 | Duffy et al. | 361/45 |

FOREIGN PATENT DOCUMENTS

| | | | |
|---|---|---|---|
| EP | 0 619 651 A1 | 10/1994 | H03K/17/08 |
| GB | 1 449 607 | 9/1976 | H02H/9/02 |
| GB | 2 176 956 A | 1/1987 | |
| WO | WO 92/02066 | 2/1992 | |

* cited by examiner

*Primary Examiner*—Duc Nguyen
*Assistant Examiner*—George Eng
(74) *Attorney, Agent, or Firm*—Allen, Dyer, Doppelt, Milbrath & Gilchrist, P.A.

(57) ABSTRACT

A telephone test set is protected from an excessive current condition by a protection circuit that maintains sufficient loop current flow for continuous operation of the telephone equipment's functional circuitry, while by-passing and/or reducing excess current that could potentially damage the protected circuitry. A series current-limiting element is installed in the loop current path between a tip and ring interface and the circuitry of the telephone test set. A current shunting circuit is installed across the tip-ring ports of the protected circuit downstream of the current-limiting element. A current sense circuit monitors the loop current and controls the operation of the shunting circuit in accordance with the magnitude of the loop current. If a substantial overcurrent condition persists for an extended period of time, the resulting power dissipation associated with the high current flow will cause the current limiting element to change to a high impedance state. Once the overcurrent condition terminates, the series element will revert to its low impedance state.

18 Claims, 1 Drawing Sheet

HIGH CURRENT PROTECTION CIRCUIT FOR TELEPHONE INTERFACE

This application is a continuation of Ser. No. 09/054,922, filed on Apr. 3, 1998.

FIELD OF THE INVENTION

The present invention relates in general to communication systems, and is particularly directed to a circuit for protecting the electronic circuitry of telephone equipment, such as but not limited to a telephone test set, from an excessive current condition such as may occur, if the telephone ring and tip leads become directly coupled to a low impedance path to a high voltage source, such as battery or loop feed circuit.

BACKGROUND OF THE INVENTION

The fact that manufacturers of telephone equipment provide instruction manuals and guidelines for use and maintenance of their equipment is no guarantee that users will not subject such equipment to potentially damaging operational and/or environmental conditions. Indeed, it is often the case that telephone repair technicians connect their portable test set equipment to very high voltage and current sources, such as power supplies or telephone loop feed circuits having very low series resistances and/or high voltages. When this happens, loop currents considerably in excess of the rated value (e.g., on the order of 100–150 ma) may result. Prolonged operation of the equipment in such a high current condition will eventually lead to failure of the equipment's electronic circuitry.

One proposal to deal with the high current condition has been to switchably interrupt or insert a high impedance device in the loop current path to the protected circuitry. While this overcurrent intervention approach prevents damage to the circuit to be protected, it also effectively renders the telephone equipment inoperative until the high current condition has terminated.

SUMMARY OF THE INVENTION

Rather than effectively shutting down the telephone equipment until the overcurrent condition subsides, the invention employs selectively controlled high current protection circuit that is effective to maintain sufficient current flow for continuous operation of the telephone equipment's functional circuitry, while at the same time controllably by-passing excess and/or reducing the amount of loop current being drawn into the equipment, that could potentially damage the protected circuitry.

For this purpose, the over current protection circuit of the invention comprises a series current-limiting element installed in the loop current flow path between a tip and ring interface (bridge rectifier) and the circuitry of the telephone equipment to be protected. An overcurrent current shunting or by-pass circuit is installed across the tip-ring ports of the protected circuit downstream of the current-limiting element. This overcurrent by-pass circuit may include the collector-emitter path of a bipolar transistor, the base of which is coupled through a level-shifting and amplifier transistor to a current sense circuit.

The current sense circuit may include a current sensing bipolar transistor, which is controllably turned on by the voltage across a relatively low value current sense resistor installed in the loop current path through the telephone's electronic circuitry to be protected. By relatively low value resistance is meant one that does not affect the operational performance of the circuitry to be protected.

During normal operation, the current flow through the current sense resistor will be less than that sufficient to forward bias the current sense transistor, so that the shunting circuitry is turned off, and all of the loop current flows through the tip-ring path, including the series current-limiting element, the protected circuitry and the current sense resistor. If the tip-ring terminals of the telephone (test) set are coupled to a high current source, such as being placed directly across the terminals of battery, then the current flow through the current sense resistor will increase to a value sufficient to turn on the current sense transistor. This, in turn will cause the overcurrent by-pass transistor to divert or by-pass a portion of the current that would otherwise flow through the electronic circuitry by way of the tip-ring loop current path.

For a medium magnitude overcurrent condition (e.g., on the order of 100–150 ma), this by-pass operation is sufficient to allow useful loop current (e.g., on the order of 20–100 ma) to flow through the protected circuitry, while allowing the excess current to be diverted without damaging the current-shunting components. However, if a substantial overcurrent condition persists for an extended period of time, the resulting power dissipation associated with this high current flow will cause the series high impedance element to change from its low impedance state to its high impedance state. In this high impedance state, sufficient operational loop current (e.g., 20–30 ma) will continue to flow through the protected circuitry, yet the components of the shunting circuitry will be protected. Once the overcurrent condition terminates, the series element will revert to its low impedance state.

DETAILED DESCRIPTION

Figure 1:
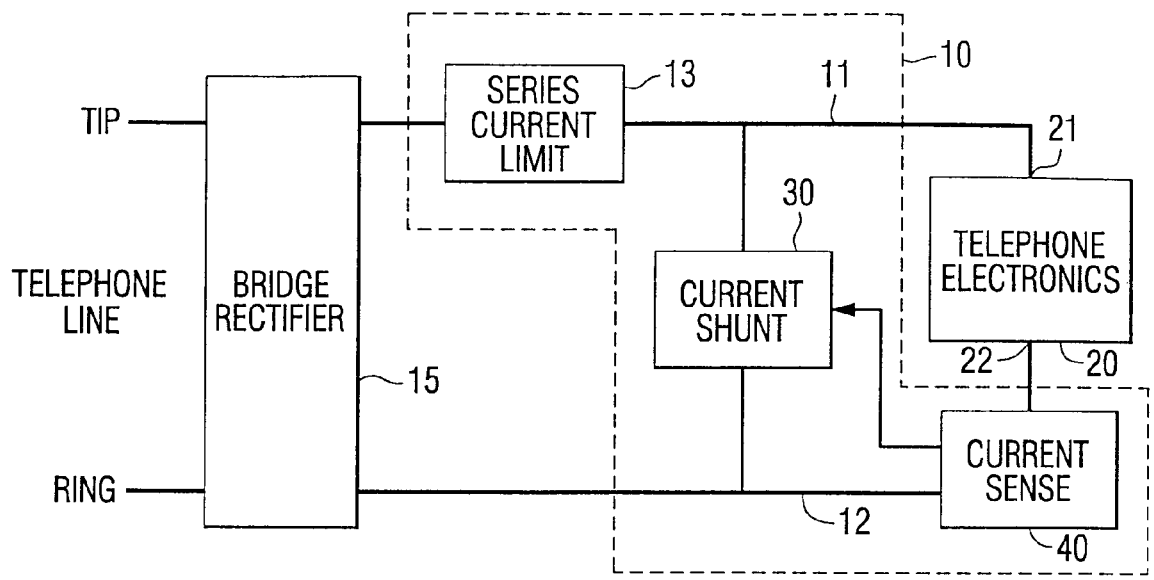
FIG. 1 is a functional block diagram of a high current protection circuit in accordance with the present invention.

Before describing in detail the new and improved high current protection circuit in accordance with the present invention, it should be observed that the invention resides primarily in what is effectively a prescribed combination of conventional communication circuit components, that are readily interfaced with the communication conductors of conventional telecommunication equipment, such as but not limited to a craftsperson's telephone test set. Consequently, the configuration of such circuits and components, and the manner in which they are interfaced with other communication system equipment have, for the most part, been illustrated in the drawings by a readily understandable functional block diagram and associated schematic. These diagrams show only those specific details that are pertinent to the present invention, so as not to obscure the disclosure with details which will be readily apparent to those skilled in the art having the benefit of the description herein. Thus, the block diagram and associated schematic illustrations are primarily intended to show the major components of the protection circuit in a convenient functional grouping, whereby the present invention may be more readily understood.

As pointed out briefly above, rather than shutting down the protected telephone circuitry until the overcurrent condition subsides, the present invention employs a selectively controlled high current protection circuit that is effective to provide sufficient current flow for maintaining operation of the telephone equipment's functional circuitry, while controllably by-passing excess and/or reducing the amount of loop current being drawn into the equipment, that could potentially damage the protected circuitry.

For this purpose, as diagrammatically illustrated in FIG. 1, the over current protection circuit of the invention, shown in dotted lines 10, comprises a series current-limiting element 13 installed in the loop current flow path 11–12 between a tip and ring interface (bridge rectifier) 15 and circuitry 20 of the telephone equipment to be protected. An overcurrent current shunting or by-pass circuit 30 is installed across the tip-ring ports 21–22 of the protected circuit 20 downstream of the current-limiting element 13. As will be described below with reference to FIG. 2, the overcurrent by-pass circuit 30 may include the collector-emitter path of a bipolar transistor, coupled through a level-shifting and amplifier transistor to a current sense circuit 40.

The current sense circuit 40 is coupled in the loop current path and is operative to monitor the magnitude of the loop current flowing therethrough. During normal current operation, wherein the loop current is less than a prescribed threshold (e.g., on the order of one hundred milliamps), the output of the current sense circuit 40 will maintain the overcurrent by-pass circuit 30 in a non-shunting state. However, in the event of an overcurrent condition, such as would occur if the tip-ring terminals of the telephone equipment were directly coupled to a high current source, such as being placed directly across the terminals of power supply (battery), the current sense circuit 40 will detect the increased current flow and trigger the overcurrent-shunting operation of the overcurrent by-pass circuit 30. For a medium magnitude overcurrent condition (e.g., 100–150 ma), loop current in excess of that necessary to provide useful loop current (e.g., on the order of 20–100 ma) to the telephone circuitry is shunted through by-pass circuit 30, while still allowing useful current to be supplied to and operate the telephone circuitry 20.

If the overcurrent condition is substantial, however, the resulting power dissipation associated with this high current flow will cause the series current-limiting element 13 to change from its low impedance state to a high impedance state, thereby substantially reducing the magnitude of the loop current (e.g., to a value flow on the order of 20–30 ma). During this high impedance state, this small but sufficient operational loop current will continue to flow through the circuitry 20, so that the telephone circuitry remains operational. In response to termination of the overcurrent condition, the series element will revert to its low impedance state.

Figure 2:
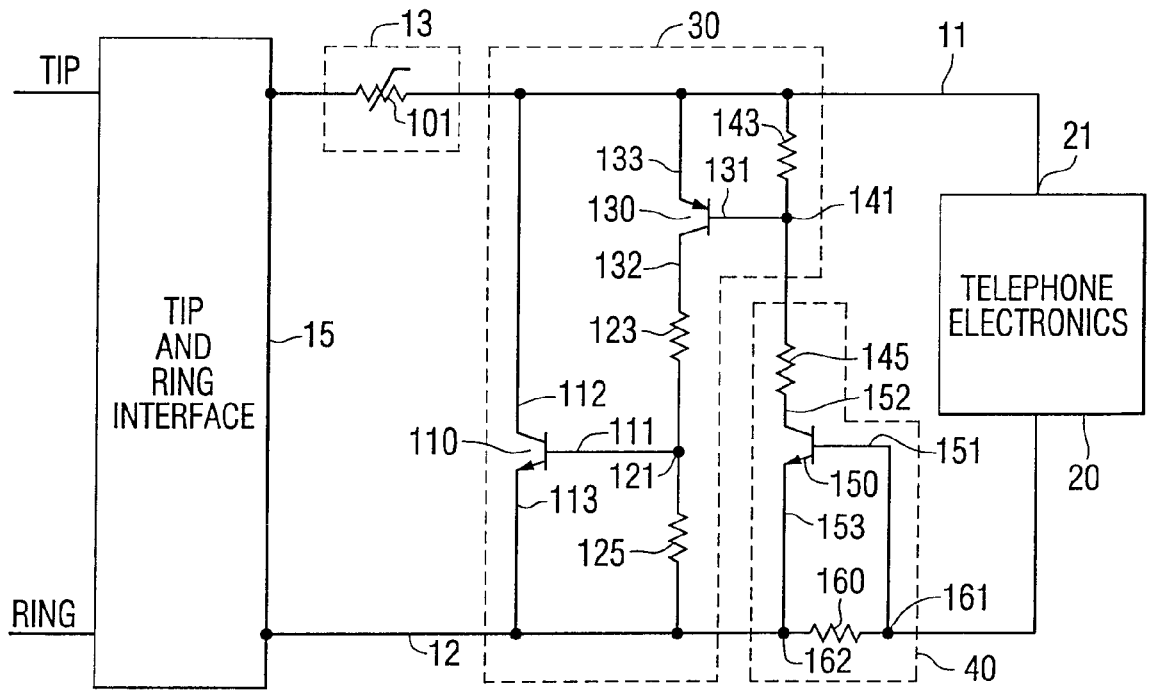
FIG. 2 is a schematic diagram of the high current protection circuit of FIG. 1.

Referring now to FIG. 2, a non-limiting example of a circuit schematic for implementing the functional block diagram of FIG. 1 is shown as comprising a resettable fuse element 101 (such as a standard conductive polymer-based power dissipation device) as the current-limiting series element 13 installed in the tip path 11 between the tip and ring interface (bridge rectifier) 15 and the first end 21 of the telephone circuitry 20 to be protected. The current shunt circuit 30 is shown as including an overcurrent by-pass or shunting NPN bipolar transistor 110 having its collector-emitter path 112-113 coupled in circuit between the fuse element 101 and the ring path 12.

The base 111 of overcurrent by-pass transistor 110 is coupled to a common node connection 121 of a pair of resistors 123 and 125, which are coupled in series with the collector-emitter path 132–133 of a level shifting and amplifier PNP bipolar transistor 130, between the tip path-installed fuse element 101 and the ring path 12. The base 131 of PNP bipolar transistor 130 is coupled to a common connection 141 of a pair of resistors 143 and 145.

Resistors 143 and 145 are coupled in series with the current sense circuit 40, which includes the collector-emitter path 152–153 of a current sensing NPN bipolar transistor 150, coupled between the tip path 11 and the ring path 12. The base 151 of current sense transistor 150 is coupled to a first end 161 of a current sense resistor 160, a second end 163 of which is coupled to the emitter 153 of current sense transistor 150. The current sense resistor 160, which is coupled in the loop current path between the ring lead 12 and a second end 21 of the telephone's electronic circuitry 20 to be protected, has a relatively low resistance (e.g., on the order of four to six ohms) so that it does not affect the operational performance of the circuitry 20.

During normal (non-overcurrent) operation, the current flow through current sense resistor 160 will be less than that sufficient to forward bias the base-emitter junction of current sense transistor 150, so that each of transistors 110, 130 and 150 is turned off, and all of the loop current flows through the tip-ring path, including the tip path-installed fuse element 101, the circuitry 20 and the current sense resistor 160. (As noted above, the magnitude of the current sense resistor 160 is sufficiently low that it does not affect the operational performance of the circuitry 20.)

If the tip-ring terminals of the telephone (test) set are coupled to a high current source, such as being placed directly across the terminals of battery as a non-limiting example, then the current flow through the current sense resistor 160 will increase to a value sufficient to forward bias the base-emitter junction of and turn on the current sense transistor 150. The resulting current flow through resistors 143 and 145 and the collector-emitter path 152–153 of current sense transistor 150 will forward bias the base-emitter junction of level shift transistor 130, which turns on transistor 130 and causes current flow through resistors 123 and 125. This in turn forward biases the overcurrent by-pass transistor 110, causing its collector-emitter path 112–113 to divert a portion of the current that would otherwise flow through the electronic circuitry 20 by way of the tip-ring loop current path.

For a medium magnitude overcurrent condition (e.g., on the order of 100–150 ma), the above-described operation is sufficient to allow useful loop current (e.g., on the order of 20–100 ma) to flow through the circuitry 20, on the one hand, while allowing excessive current to be diverted without damaging the diverting or shunting components. However, if the overcurrent condition is substantial (e.g., it exceeds a few hundred milliamps for an extended period of time), then the resulting power dissipation associated with this high current flow will cause the resettable fuse element 101 to change from its low impedance state to a high impedance state. During this high impedance state of the current-limiting element 101, sufficient operational loop current (e.g., 20–30 ma) will continue to flow through the circuitry 20; however, the components of the shunting circuitry 30 will be protected. Once the overcurrent condition terminates, the series element 101 will revert to its low impedance state, as described above.

In this state, the telephone circuitry and the protection circuit of the invention appear as a continuous load on the telephone line, as seen from upstream central office switching equipment. Since (a small amount of) loop current continues to flow, the central office equipment does not detect that the telephone circuit has gone on-hook and drop the call. The invention also accommodates the situation where the user attempts to go off-hook during a ringing signal, which may have peaks on the order of well in excess of 100 volts. In a conventional protection circuit, transitioning to its high impedance protection state may prevent the ring-trip circuit at the central office from responding, so that the ringing signal does not immediately terminate, as the normally low off-hook termination resistance will not be sensed. This constitutes an annoyance to the user, who is not accustomed to the phone ringing when it is off-hook.

Thus, rather than switchably interrupt or insert a high impedance device in the loop current path to the circuitry to be protected, as in the prior art, which effectively renders the telephone equipment inoperative until the high current condition has terminated, the overcurrent protection mechanism of the invention maintains sufficient current flow for continuous operation of the telephone equipment's functional circuitry, while at the same time controllably by-passing excess and/or reducing the amount of loop current being drawn into the equipment, that could potentially damage the protected circuitry.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A protection circuit comprising:
   input terminals arranged to be coupled to a source of electrical energy;
   output terminals arranged to be coupled to an output circuit to be protected;
   a variable impedance device coupled in a current flow path between said input and output terminals, and through which all current flowing into said input terminals from said source of electrical energy flows irrespective of the impedance state of said variable impedance device;
   an overcurrent bypass circuit coupled to receive said all current flowing through said variable impedance device and being operative to controllably cause a portion of said all current flowing through said variable impedance device to be diverted around said output circuit to be protected through a bypass path away from said output circuit; and
   a current flow sense circuit coupled to monitor current flow through a current flow path through said output circuit and being operative, in response to an overcurrent condition, to cause said overcurrent bypass circuit to controllably divert a first portion of said all current flowing through said variable impedance device to be directed through said bypass path away from said output circuit, while allowing a second portion of said all current flowing through said variable impedance device, and sufficient to operate said output circuit, to continue to flow through said current flow path and said output circuit.

2. A protection circuit according to claim 1, wherein said variable impedance device is operative, in response to said overcurrent condition reaching a prescribed level, to change from a low impedance state to a high impedance state, thereby reducing current flow therethrough to a value sufficient to continue to operate said output circuit, but less than a value that could damage said overcurrent by-pass circuit.

3. A protection circuit according to claim 2, wherein said variable impedance device is operative, in response to said overcurrent condition dropping below said prescribed level, to change from said high impedance state to said low impedance state.

4. A protection circuit according to claim 1, wherein said output circuit comprises a telephone circuit and said input terminals are arranged to be coupled with tip and ring conductors of a telephone line.

5. A protection circuit according to claim 4, wherein said variable impedance device comprises a series current-limiting element installed in a loop current flow path between a tip and ring interface and circuitry of telephone equipment to be protected.

6. A protection circuit according to claim 5, wherein said overcurrent by-pass circuit is installed across tip—ring ports of said circuitry of telephone equipment to be protected downstream of said series current-limiting element.

7. A protection circuit according to claim 1, wherein said overcurrent by-pass circuit includes a current input-output path of a controlled switching device, which is controlled by said current flow sense circuit.

8. A protection circuit according to claim 1, wherein said current flow sense circuit includes a current sensing resistor installed in said current flow path, and a threshold circuit which is coupled to monitor voltage across said current sensing resistor and to control the operation of said overcurrent by-pass circuit.

9. A protection circuit according to claim 8, wherein said overcurrent by-pass circuit includes a current input-output path of a controlled switching device, which is controlled by said threshold circuit.

10. A method of protecting a signaling circuit from an overcurrent condition in a current supply path for said signaling circuit, while allowing said signaling circuit to continue to operate in the presence of said overcurrent condition comprising the steps of:
    (a) monitoring current flow through a variable impedance device, which is installed in said current supply path and through which all current supplied from a source of electrical energy for operating said signaling circuit flows irrespective of the impedance state of said variable impedance device; and
    (b) in response to said overcurrent condition in said current supply path, diverting a first portion of said all current flowing though said variable impedance device away from said signaling circuit, while allowing a second portion of said all current flowing through said variable impedance device, that is sufficient to operate said signaling circuit, to continue to flow through said signaling circuit.

11. A method according to claim 10, wherein said signaling circuit comprises a telephone circuit and wherein said current supply path is coupled with tip and ring conductors of a telephone line.

12. A method according to claim 10, further including the step of:
    (c) in response to said overcurrent condition reaching a prescribed level, placing said variable impedance device in a high impedance state, thereby reducing current flow therethrough to a value sufficient to continue to operate said signaling circuit.

13. A method according to claim 12, wherein step (b) includes diverting said first portion of current through a current shunting circuit that by-passes said signaling circuit.

14. A method according to claim 12, wherein step (c) comprises placing said variable impedance device in a high impedance state that reduces current flow therethrough to a value sufficient to continue to operate said signaling circuit, but less than a value that could damage said current shunting circuit.

15. A method according to claim 14, wherein said variable impedance device comprises a series current-limiting element installed in a loop current flow path between a telephone tip and ring interface and said signaling circuit.

16. A method according to claim 14, further including the step of:

(d) in response to said overcurrent condition dropping below said prescribed level, placing said variable impedance device in a low impedance state.

17. An overcurrent protection circuit for protecting a signaling circuit from an overcurrent condition comprising:

a variable impedance installed in a current flow path through which all current is supplied from a source of electrical energy to said signaling circuit, irrespective of the impedance state of said variable impedance, and having a relatively low impedance state in response to said all current flowing therethrough being less than a threshold, and having a relatively high impedance state in response to said all current flowing therethrough being equal to or greater than said threshold; and a current by-pass circuit coupled between said variable impedance and said signaling circuit and being operative, in response to said all current flowing through said variable impedance and said current flow path for said signaling circuit being greater than an overcurrent threshold, to selectively by-pass a first portion of said all current flowing through said variable impedance around said signaling circuit, while allowing a second portion of said all current flowing through said variable impedance to continue to flow through said current flow path for said signaling circuit.

18. An overcurrent protection circuit according to claim 17, wherein said signaling circuit comprises a telephone circuit, and wherein said current flow path is adapted to be coupled to tip and ring conductors of a telephone line.

* * * * *